United States Patent [19]

Grubbs

[11] 4,120,426

[45] Oct. 17, 1978

[54] LIQUID CARRIER AND DISPENSER APPARATUS FOR VEHICLES

[76] Inventor: William J. Grubbs, 2041 S. Kolb Rd., Tucson, Ariz. 85710

[21] Appl. No.: 767,527

[22] Filed: Feb. 10, 1977

[51] Int. Cl.² ............................ B67D 5/60; B67D 5/62
[52] U.S. Cl. .................................... 222/183; 222/185; 222/564
[58] Field of Search ............... 222/131, 183, 175, 185, 222/564; 221/221

[56] References Cited

U.S. PATENT DOCUMENTS

| 357,272 | 2/1887 | Donavin | 222/131 |
|---|---|---|---|
| 2,830,613 | 4/1958 | Mason | 222/131 |
| 3,310,830 | 3/1967 | Gattone | 222/183 X |
| 3,386,605 | 6/1968 | Lafont | 222/183 X |
| 3,568,890 | 3/1971 | Leachman | 222/183 |

*Primary Examiner*—Allen N. Knowles
*Assistant Examiner*—David A. Scherbel
*Attorney, Agent, or Firm*—H. Gordon Shields

[57] ABSTRACT

Apparatus is disclosed for holding and dispensing hot and cold liquids in a vehicle, including a horizontally disposed cylinder which fits in a holder secured to the vehicle for holding the apparatus, and a filler cap separate and remote from the liquid dispensing valve for conveniently allowing the apparatus to remain in an initial orientation for filling and for dispensing.

11 Claims, 21 Drawing Figures

LIQUID CARRIER AND DISPENSER APPARATUS FOR VEHICLES

BACKGROUND OF THE INVENTION

1. Field of the Invention:

This invention relates to insulated liquid carriers and dispensers usable in a vehicle, and, more particularly, to an insulated cylindrical holder for a liquid having a dispenser valve and a filler hole.

2. Description of the Prior Art:

Liquid holding and dispensing apparatus have been marketable items for many years. The need for transporting fluids for the convenience of travelers is, of course, as old as the history of travel. Along with the improvements in transportation have come the improvements in the apparatus used to carry and dispense liquids. Moreover, as travelers have become more sophisticated with more sophisticated means of travel, the demand for more sophisticated liquid dispensing apparatus has continued. Originally, it was sufficient merely to be able to provide water for travelers. However, travelers then demanded cold water for summer travel, and then a hot drink, such as hot coffee, for winter or cold weather travel.

Vacuum type insulated bottles or carriers were developed to provide optimum temperature maintenance characteristics to match the characteristics of the liquids used in the bottles. Vacuum bottles have three primary limitations. One limitation is in expense of manufacturing, since the vacuum bottles must be blown, usually out of glass, and then an external protective covering must be disposed on the outside of the bottle, with appropriate spacers, gaskets, and the like. A second limitation is in the inherent structural problems of the bottle. The glass is breakable and accordingly must be protected as much as possible from shocks which may break the bottle. The third limitation is in weight. Since glass is a relatively heavy material, and a double walled vacuum bottle is doubly heavy, the weight of liquids then becomes an additional, but of course inherently necessary, weight.

When foam elastomeric substances, such as styrofoam, were developed, the styrofoam as an insulator became a ready replacement for vacuum bottles. A relatively thin and relatively inexpensive plastic liner is used to contain the liquid, and the liner is typically surrounded by an appropriate thickness of foam insulation. The foam insulation, and the plastic liner, both readily lend themselves to various types of casting processes and are thus relatively inexpensive to make. In addition, the foam is very light weight, as compared with glass, and while it dents relatively easily, it is not fragile like glass is. Typically, the foam insulation is disposed between the inner container which holds the liquid and an outer shell or covering which is normally of a more dense plastic than the foam and which protects the foam. In some cases, an external or outer shell may not be used.

Numerous patents have been granted for various types of insulated liquid holders and dispensers, with various modifications, either in the dispensing valves or in the design of the apparatus itself. For example, U.S. Pat. No. 1,723,070 discloses a vacuum bottle type insulator for holding liquids, with a spigot valve at its lower end and a mouth remote from the spigot.

U.S. Pat. No. 1,794,641 discloses what appears to be an improvement or modification of the '070 patent, with a more elaborate dispensing valve system. The '641 patent retains the vacuum bottle insulation system for the liquid.

U.S. Pat. No. 2,117,585 discloses a vacuum insulated apparatus for holding and dispensing hot or cold liquids which includes a glass tube disposed exteriorally of the vacuum container and connected with the dispensing cock or valve to indicate the amount of fluids remaining in the apparatus.

U.S. Pat. No. 2,326,434 discloses a thermal jug with a dispenser valve secured to the exterior periphery of the jug and actuable by moving the dispenser nozzle from a closed position against the jug to an open position outwardly from the jug. While the dispenser nozzles of the patents discussed above have been actuated by a horizontally rotatable valve or cock in a fixed position, the apparatus of the '434 patent includes a vertically disposed valve or cock arrangement which is integral with the dispenser nozzle. Movement of the nozzle accordingly activates the valve.

A foam type insulator with an interior container and an exterior protective covering is shown in U.S. Pat. No. 2,376,064. The spigot for the apparatus extends through the insulation and outwardly of the exterior covering. The inner container includes integral spacers which space the inner container from the outer covering to allow for a relatively uniform thickness in the foam insulation material disposed between the inner container and the outer covering.

A multiple chamber or compartment container is disclosed in U.S. Pat. No. 3,589,566. A plurality of containers, each with its separate spigot, is disposed within an insulated sheath to provide for the carrying of a plurality of different liquids, if desired. The exterior of the apparatus includes a protective covering spaced apart from the inner compartments and disposed on the outside of the insulation material.

While there are other embodiments of insulated types of apparatus, the above described patents typify the prior art.

Figures 1, 2, 3, 4, 5:
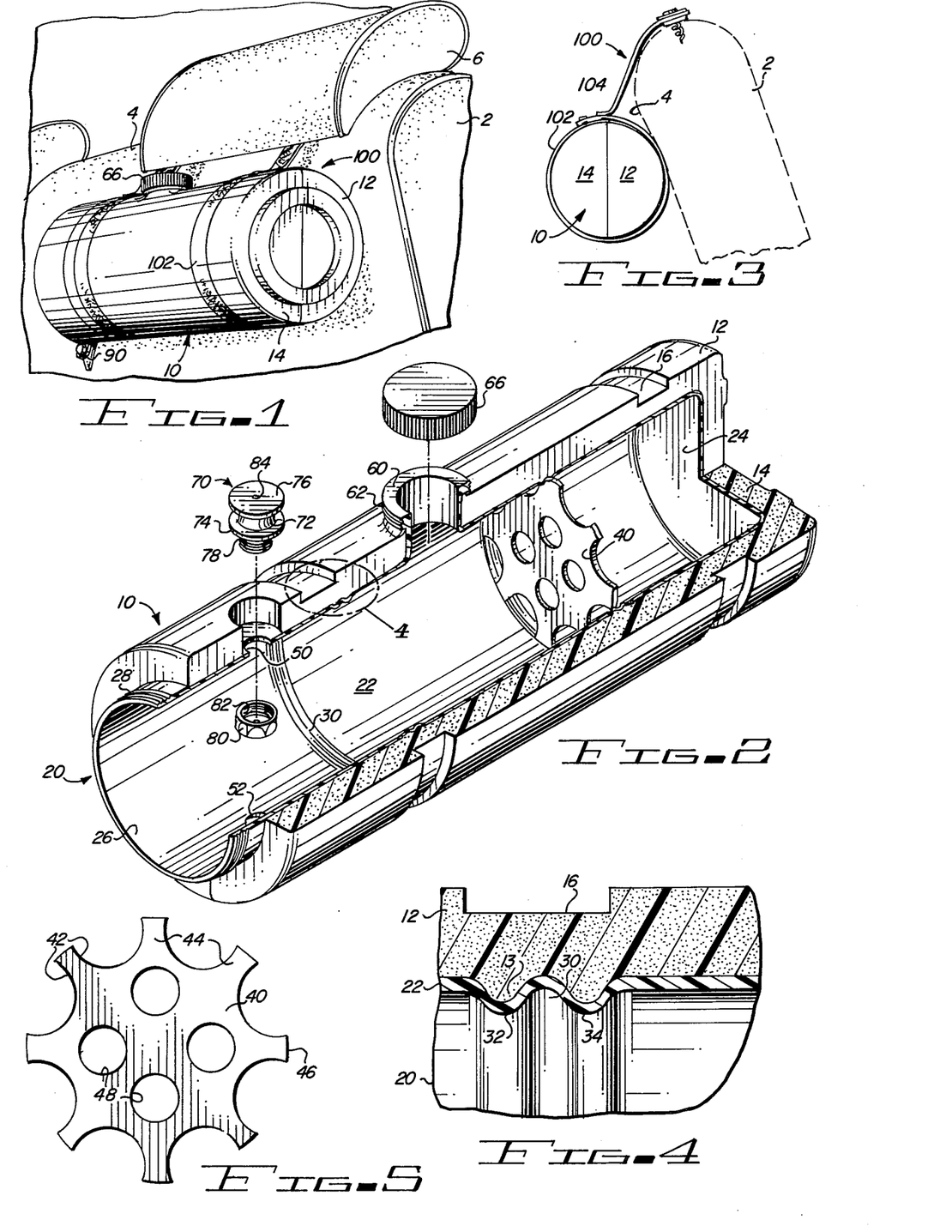
FIG. 1 is a perspective view of the apparatus of the present invention shown secured to the back of a seat in an automotive vehicle.
FIG. 2 is a perspective view in partial section of the apparatus of FIG. 1.
FIG. 3 is a side view of the apparatus of FIG. 1 illustrating the holder for the jug apparatus.
FIG. 4 is an enlarged detail view in partial section of a portion of the apparatus of FIG. 2.
FIG. 5 is an end view of a baffle usable in the apparatus of the present invention and illustrated in FIG. 2.

Of the patents above described, the '434 patent, the '064 patent, and the '566 patent are adapted to be used in vehicles. However, each has its limitations. For example, with the '064 apparatus, as shown in FIG. 3, the jug must be raised manually above the floor or placed on a seat in order for a user to put a cup or other receptacle beneath the spigot. Unless the cap is loosened from the top of the jug, to allow air to enter into the jug as the liquid is dispensed from the jug, the liquid will come out in spurts. The pauses between spurts allow air to flow into the interior of the jug to replace the fluid. Similarly, the '434 jug must also be lifted off the floor of the vehicle if it is disposed on the floor and either held or placed on the seat in order to allow the fluid to flow out of the jug into a cup or other container. Also, the cap must be loosened to allow air to flow into the jug as the liquid flows out.

With the '566 jug apparatus, it also must either be lifted off the floor of the car and manually held or placed on a seat in order to allow the jug to be used. Typically in vehicles, such as automotive vehicles, the jugs are carried on the floor of the car as the most convenient place to keep them. The larger jugs have a separate spigot at the lower portion of the jug from which the fluid flows and accordingly the jug must be disposed above the receptacle or container to allow the fluid to flow from the jug. Movement of the vehicle sometimes renders use of such jugs somewhat hazardous in that the likelihood of spilling is great. This is doubly a problem when provisions are not made for the air to flow into the jug as liquid flows out of the jug. The spurting action of the fluid as it flows out of the jug is not in an even stream, but rather in a pulsating stream which varies in distance from the jug, depending on the specific design of the dispenser and the amount of fluid in the container. Regardless of the circumstances, the pulsating effect or spurting of the fluid makes it hazardous to use the jug without the high likelihood of spilling, when the vehicle is in motion.

In smaller models, insulated jugs do not usually have a spigot separate from the filler. It is accordingly necessary to remove the cap from the top of the container and tilt the container to pour liquid into a receptacle. Again, this is hazardous in a moving vehicle because the likelihood of spilling is great. Moreover, such an arrangement renders it virtually impossible for a driver or single occupant of the vehicle to use the jug apparatus while the vehicle is in motion. Even with a jug with a separate spigot, it is rather difficult for a single occupant of a vehicle to dispense a liquid from a jug without a likelihood either of spilling or of an accident due to loss of control of the vehicle.

SUMMARY OF THE INVENTION

The invention described and claimed herein comprises an insulated container for liquids, including a preferably horizontally disposed cylinder having a dispensing spigot and a separate filler opening and having an air valve for allowing air to bleed into the container as the liquid flows out of the container. Holder apparatus is included for maintaining the apparatus in a generally horizontal attitude within a vehicle for convenience of use.

Among the objects of the present invention are the following:

to provide new and useful liquid container apparatus;

to provide new and useful insulated liquid containing and dispensing apparatus;

to provide new and useful apparatus for holding and dispensing a liquid in a vehicle having separate filler, dispenser valve, and air valve;

to provide new and useful liquid holder apparatus including baffles within the apparatus for retarding the movement of fluids within the apparatus;

to provide new and useful insulated apparatus for use in a vehicle and operable by use of a single hand; and to provide new and useful liquid container apparatus having a cylindrical container with an end cap on one end of the container and a separate filler boss closed by a vented cap.

DESCRIPTION OF THE PREFERRED EMBODIMENT

FIG. 1 is a perspective view of liquid container apparatus 10 of the present invention shown secured to a back 4 of a seat 2 in an automotive vehicle. The apparatus 10 includes a pair of insulator shells 12 and 14, each of which is a half of the total insulator shell in which is disposed a fluid cylinder. The insulator shells are symmetrical with respect to each other and to the fluid container disposed therein.

The liquid container apparatus 10 illustrated in FIG. 1 is disposed in a horizontal orientation, with the axial length of the apparatus, which is generally cylindrical in configuration, horizontally extending. On the side of the apparatus, shown illustratively in FIG. 1 as at the top of the apparatus, is a cap 66 which covers a filler boss. Disposed on the bottom of the apparatus, as viewed in FIG. 1, and adjacent one end of the apparatus, is a spigot 90 for draining fluids from the apparatus.

The container apparatus 10 is held in place on the car seat 2 by means of a harness 100, which is preferably made of cloth. The harness includes a pair of straps 102 which extend circumferentially about the apparatus in a pair of grooves which are recessed into the two shells 12 and 14. The straps 102 securely hold the two insulator shell portions 12 and 14 together about the container or liner disposed within the shells. The harness 100 is secured on the back 4 of the car seat 2.

In FIG. 1, the apparatus 10 is shown disposed at one end of the car seat 2, beneath a head rest 6. Obviously, the apparatus may be secured to the car seat at any convenient location.

FIG. 2 is a perspective view in partial section of the container apparatus 10 of FIG. 1. Within the two insulator shell halves 12 and 14 is a container or liner 20. The container 20 is generally cylindrical in configuration, and closed at one end by a bottom end wall 24. The other end of the container 20, remote from the closed end 24, is open to define a mouth 26. The open end 26 includes an externally threaded portion 28 extending outwardly from the insulator shells to receive an end cap. The ends 24 and 26 of the container 20 are generally perpendicular to the longitudinal axis of the container, as clearly shown in FIG. 2.

Centrally disposed with respect to the container and also with respect to the insulator shells 12 and 14 is an upwardly extending central filler boss 60. The filler boss 60 includes an externally threaded portion 62 which mates with internal threads on the cap 66. Each of the insulator shells 12 and 14 includes a semi-circular relieved portion into which the filler boss 60 extends. Thus the insulation is disposed about the filler boss to maximize the insulation protection to the container 20 and to any liquid disposed therein.

Adjacent the open end 26 of the container, and aligned with the central filler boss 60, is an aperture 50 which extends through the container 20. The aperture 50 receives a vent plug 70. Diametrically opposite the aperture 50 is another aperture 52 which also extends through the container 20. The aperture 52 receives the spigot 90 (see FIG. 1). Since both apertures 50 and 52 are aligned with respect to each other and with respect to the filler boss 60, the respective insulator shells 12 and 14 each include cut out portions which match the apertures and which accordingly fit around the vent plug and spigot, respectively, which extend through the apertures.

The vent plug 70 comprises a generally cylindrical body 72 which includes a pair of radially outwardly extending and spaced apart flanges 74 and 76. The flange 74 seats on the exterior periphery of the container cylinder 22 about the aperture 50. The flange 76 is spaced apart from the flange 74 to allow the insulator shells to fit against the body 72. The flange 76 thus helps to protect the insulation about the vent plug and beneath the flange 76.

A threaded portion 78 of the vent plug 70 is disposed beneath the body 72 and extends through the aperture 50, and a nut 80 is secured to the threaded portion to hold the plug in place. The nut 80 includes internal threads 82 which matingly engage the externally threaded portion 78. Appropriate gaskets may be used with the vent plug 70 on either or both sides of the container's cylinder wall, as desired.

An aperture 84 extends through the plug 70 to communicate ambient atmospheric pressure to the interior of the cylinder 22 to allow a smooth fluid flow out of the spigot 90.

Both insulator shells 12 and 14 include a pair of matching and aligned recessed grooves 16 which extend slightly into the insulation from the top or outer surface of the insulation to receive the straps 102 of the harness 100, as shown in FIG. 1. The straps securely hold the two halves of the insulation, that is, the insulator shells 12 and 14, to the container 20 and also serve as appropriate carrying straps, as an integral part of harness 100, as discussed in detail below in conjunction with FIGS. 14-18.

For convenience in cleaning the apparatus, the straps 102 may be removed from the grooves 16 on the outer periphery of the insulator shells, and the insulator shells may then be removed from the container 20. This allows the container 20 to be thoroughly cleaned, as required. The insulator shells 12 and 14 are preferably made of a cellular foam type plastic, such as is marketed under the term "Styrofoam". The container 28 is also preferably made of a plastic material. There are several appropriate types of plastics that are well known and that are widely used in the art that may be used for the container.

The end cap covering the opening or mouth 26 at the end of the container provides complete freedom of access to the interior of the container for cleaning. The exterior of the container may also be cleaned by removing the straps and insulator shells. Moreover, the vent plugs 70 and the spigot 90 may also be easily removed for appropriate cleaning. While gaskets or other seals are not shown in conjunction with vent plug 70 and spigot 90, it is well known and understood that such gasket or sealing material may be required.

Within the container 20 are a pair of grooves 20 which are spaced apart of each other longitudinally on the interior periphery of the container, and preferably one is disposed on either side of the central filler boss 60. The grooves receive a pair of baffles or discs 40 which inhibit the axial or lengthwise flow of fluid within the container in response to movement of the vehicle. The baffles include appropriate apertures extending through the baffles and appropriate scallops on the outer periphery of the baffles to allow for the flow of fluid through the baffles, as will be discussed in detail below in conjunction with FIG. 5.

FIG. 3 is a side view of the apparatus of FIGS. 1 and 2 illustrating the holder for the liquid container apparatus 10 secured to the back 4 of a car seat 2. The liquid container apparatus 10 is shown from its closed end 24 (see FIG. 2) with the harness 100 holding the two halves 12 and 14 of the insulation to the container. The harness 100 includes circumferentially extending straps 102 which overlap each other and which include appropriate snaps to secure the straps together, interlooped around and within the grooves 16 (see FIG. 2) which extend into the outer periphery of the insulator shell to receive the straps. The loop straps 102 include a handle strap 104 preferably sewn, or otherwise appropriately secured to, the loops and extending radially outwardly from the loops, or upwardly as shown in FIG. 3. In turn, the handles preferably include a snap provision for securing the harness 100 to the seat 2 in conjunction with a base portion of the harness which is secured by well known spiral screws, as illustrated below, and which extend into the seat.

The weight of the apparatus and of the fluid within the apparatus, holds the apparatus against the seat back 4 downwardly from the upper portion of the seat. In practice, the handle straps 104 may be variable in length to thus allow the liquid container apparatus 10 to be located at an appropriate position on the seat of a vehicle.

FIG. 4 is an enlarged view, in partial section, of a portion of the apparatus of FIG. 2 taken generally from the circle 4 of FIG. 2. It comprises a view in partial section of the insulator shell 12, showing the recessed groove 16 which receives a strap 102, and the groove 30, which receives a disc 40. The groove 30 is really a convolution in the cylinder wall 22 of the cylinder 40. Accordingly, the groove 30 comprises a concave convolution disposed between a pair of convex convolutions 32 and 34. As clearly indicated in FIG. 4, the convolutions are molded into the wall of the cylinder 22 to provide the concave groove 30 on the inner periphery of the cylinder 22, and there are appropriate matching convolutions, merely inverted, on the exterior of the cylinder against which the insulator shell 12 is disposed. The insulator shell 12 has matching protuberances or convolutions 13 which mate with the convolutions of the container cylinder. The mating engagement between the insulator shell 12 and the container 20 help to position and hold the container within the insulator shell.

FIG. 5 is a view of a baffle or barrier 40, comprising a disc which includes a plurality of scallops or relieved portions 42 which extend inwardly in a semi-circular configuration from the outer periphery of the disc. Between the scallops or relieved portions are arms 44. At the outer extremity or edge of each of the arms 44 is a rounded end 46. The radius of curvature of the rounded ends 46 conforms to the radius of curvature of the grooves 30 on the inner periphery of the cylinder 22, in which grooves the discs 40 are disposed, as illustrated in FIGS. 2 and 4.

Inwardly from the scallops 42 are a plurality of apertures or holes 48 which extend through the disc. When the discs 40 are in position, fluid within the container flows through the holes 48 and through the scallops 42, but is retarded in sudden movement or sloshing by the solid portions of the discs.

The baffles or discs 40 are preferably made of relatively thin plastic which will remain in place and not be moved out of place in response to the sloshing of liquid or fluid, or even ice cubes, disposed within the container. However, the discs are also flexible enough to be deformed in order to remove them from the grooves 30 for complete cleaning of both the disc and the container. To accomplish the removal of the discs, a user need only insert a hand in the open end 26 of the container, and place his fingers and thumb appropriately on the disc, such as in a hole and at an aperture, and apply pressure to deform the disc by reducing its overall circumference and then lift the disc easily out of the groove 30. Once out of the groove 30, the disc will move easily through the cylinder 22 and out the open end 26.

Referring again to FIG. 4, it will be noted that the diameter of the groove 30 is substantially the same as the diameter of the container 30, with the convolutions 32 and 34 extending inwardly from the wall of the cylinder 32 to form two convolutions of a reduced diameter with respect to the normal or cylindrical diameter of the cylinder 22. Accordingly, if the diameter of the discs 40, measured at the outer periphery of the ends 46, is substantially the same or slightly less than the normal diameter of the cylinder 22, the discs will move easily through the cylinder once clear of the convolutions 32 or 34. In this manner, the discs may readily be removed from the cylinder for cleaning of both the discs and the cylinder.

Figures 6, 7, 8, 9:
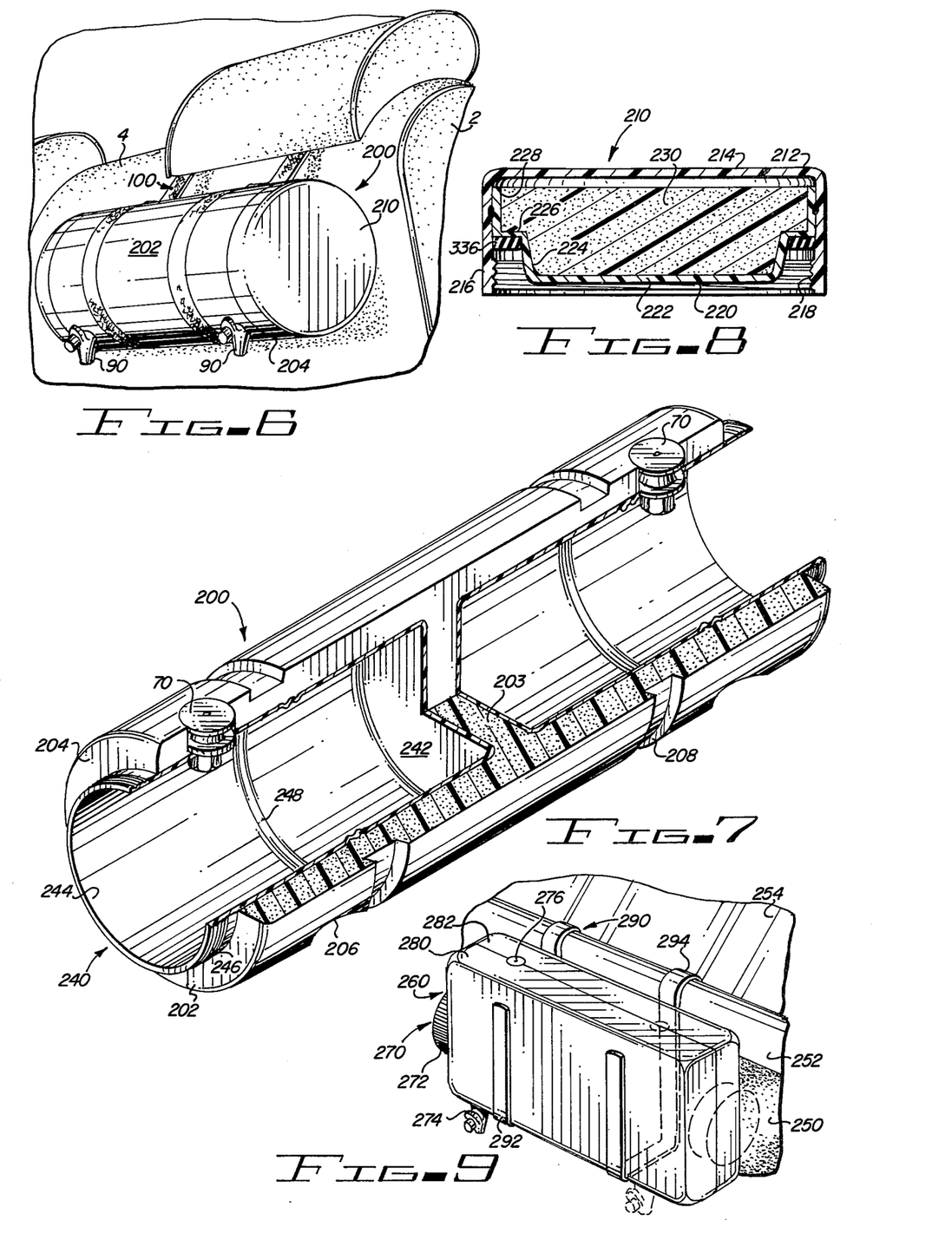
FIG. 6 is a perspective view of a container having two separate compartments for holding and dispensing liquids secured to the seat of a car.
FIG. 7 is a perspective view in partial section of the container apparatus of FIG. 6.
FIG. 8 is a view in partial section of an end cap usable with the apparatus of FIG. 7.
FIG. 9 is a perspective view of an alternate arrangement of the apparatus of FIGS. 6–8.

FIG. 6 is a perspective view of an alternate embodiment of the apparatus of FIGS. 1–5, comprising a dual compartment container 200. The container 200 is shown disposed in substantially the same orientation as the apparatus 10 of FIG. 1, which is secured to the back 4 of a seat 2 by a harness 100. The harness 100 is accordingly usable on both the apparatus 10, illustrated in FIG. 1, as well as on container apparatus 200 shown in FIG. 6.

The container apparatus 200 includes a pair of insulator shells 202 and 204, which are substantially identical halves which mate together about a pair of cylinders disposed within the insulator shells. The cylinders within the insulator shells are each closed by an insulated cap 210, a sectional view of which is shown in FIG. 8. Each cylinder is in turn drained by a pair of spigots 90, which spigots are substantially identical to the spigot 90 which drains the apparatus 10 of FIG. 1. Diametrically opposite the spigots 90 are a pair of vent plugs, such as illustrated in conjunction with FIG. 2 and identified by reference numeral 70. As illustrated above in conjunction with FIGS. 1 and 2, the insulator shells 202 and 204 (see FIG. 7) include appropriate cutouts for the spigots and the vent plugs.

FIG. 7 is a perspective view in partial section of the container apparatus 200 of FIG. 6, showing the insulator shells 202 and 204 cut away to disclose a pair of cylinders 240 disclosed in the shells. The cylinders 240 are also cut away to show the configuration of the cylinders.

Each cylinder 240 includes a closed end wall 242 and an open end or mouth 244. The open ends 244 include externally threaded portions 246 which each receive a cap, such as cap 210, shown in detail in FIG. 8. Within each cylinder is a groove 248 which receives a baffle disc, such as the baffle disc 40 shown in FIGS. 2 and 5. Since the cylinders 240 are substantially shorter than the cylinder 20 of FIG. 2, only a single baffle is required in each cylinder 240 to prevent sloshing, etc. The grooves 248 are substantially identical to the grooves 30, one of which is shown in enlarged detail in FIG. 4. Accordingly, the configuration of the cylinder 240 at the groove 248 comprises a series of convolutions, such as illustrated in detail in FIG. 4.

The cylinders 240 are inserted into the insulator shells 202 and 204 in an end-to-end relationship, with their open ends or mouths 244 extending outwardly and oppositely with respect to the insulator shells.

Each cylinder 240 also includes a pair of apertures, preferably diametrically opposite each other, for receiving a vent plug 70 and a spigot, such as spigot 90 shown in FIG. 6. Due to the relatively shortened size of each cylinder, as opposed to the cylinder 20 of FIGS. 1 and 2, a top filler may not be practical, and accordingly the filling of the cylinders, as well as the cleaning, is accomplished through the open ends or mouths 244.

Each insulator shell includes appropriate cutouts for the vent plugs 70 and the spigot 90 (see FIG. 6). A pair of cutouts 206 is shown in insulator shell 202 to receive the spigots 90. When the cylinders are properly inserted into the insulator shells, the appropriate apertures in the cylinders and in the insulator shells are aligned to allow for the vent caps and the spigots.

Between the cylinders is a partition 203 which comprises a semicircular partition secured to each of the insulator shells. Each of the partitions comprises a semicircular portion which mate together to form a single partition between the two cylinder halves. Alternate types of partitions may also be used, such as a single partition secured to only one of the insulator shells and mating with the other insulator shell, for a removable partition, separate from each of the shells, but fitting each of the shells, as in a groove or depression on the inner periphery of each of the shells. The separate or removable partition may of course be removed for cleaning, as when the shells are taken apart.

About the outer periphery of each of the insulator shells are a pair of grooves or depressions 208 which extend downwardly, or radially inwardly, from the outer periphery of each insulator shell a distance sufficient to receive the straps 102 of the harness 100, as shown in in FIG. 6. The grooves 208 are spaced apart, along the outer periphery of the apparatus 200 and are disposed over each of the cylinders.

FIG. 8 is a view in partial section of a cap 210 which threadedly engages the cylinders to close the open end 244 of each cylinder.

The cap 210 includes an outer shell 212 which is generally cup shaped in configuration, and it includes a top or end 214 secured to a cylinder 216. The cylinder or cylinder walls 216 extend downwardly from the top 214 substantially perpendicular thereto. The end of the cylinder 216 remote from the top 214 is open, and it includes an internally threaded portion 218 which matingly engages the external threads 246 of the cylinders 240 (see FIG. 7). Disposed within the outer shell 212 is a liner 220 which includes a bottom 222 which is substantially parallel to the top 214, but of lesser diameter than the top and spaced apart from the top and disposed in the proximity of, or adjacent, the internal threads 218 of the outer shell 212. Extending upwardly from the bottom 222 is a lower sloping wall 224 which slopes upwardly and outwardly toward the cylindrical walls 216 of the outer shell 212. The sloping wall 224 extends upwardly within the outer shell a distance above the termination of the threads 218.

Extending radially outwardly from the upper portion of the lower sloping wall is a shoulder 226. The shoulder 226 extends radially outwardly and terminates against the cylinder 216. From the shoulder 226, an upper straight wall 228 is juxtaposed against, and is secured to, the inner periphery of the cylinder 216. Within the liner 220, and interposed between the bottom wall 222 and the top wall 214 of the outer shell 212, is appropriate insulation 230, which may be of the same insulative material out of which the insulator shells 202 and 204 are formed.

A gasket 236 is shown disposed against the shoulder 226. The gasket 236 is an annular gasket which extends about the lower sloping wall 224 and against the shoulder 226. When the cap 210 is secured to a cylinder 240, the gasket 236 appropriately seals the cap and the cylinder to prevent the leakage of fluid from within the cylinder.

The cap 210 illustrated in FIG. 8, and shown in conjunction with the apparatus of FIGS. 6 and 7, may also be used with the apparatus of FIGS. 1 and 2. The mouth 26 of the apparatus 10 is substantially the same as the mouth 244 of the cylinder 240, and the respective threads 28 and 246 are also substantially identical and accordingly the same type of cap may appropriately be used with both the cylinder 20 and the cylinders 240. Moreover, the general design of cap 210 may also be employed in cap 66 shown in FIGS. 1, 2, and 10. Cap 210 is a cap which may be threadedly secured to a mating portion of a container. The cap includes insulation and a gasket for sealing the cap and the container.

With respect to the container apparatus 200, obviously the twin cylinder type container may be used to carry two different kinds of fluids, such as either one hot fluid and one cold fluid, or else two different kinds of either hot or cold fluids, as desired. If ice cubes are used within the apparatus, they may be placed within the cylinders before a baffle, such as baffle 40 of FIG. 5, is disposed in the groove 248, or they may be placed within the cylinders after the baffle has been inserted, as desired.

FIG. 9 is a perspective view of an alternate arrangement of the apparatus of the present invention. It comprises a perspective view of a rectangularly configured container apparatus 260 secured by a rectangularly configured holder 290 secured to a sill or molding 252 of a door 250, rather than to a seat back as in the previous embodiments.

Container apparatus 260 includes a container 270 disposed within a pair of rectangularly configured insulator shells 280 and 282. The container 270 may be either a single container, as illustrated in FIGS. 1–5, or a dual container, as illustrated in FIGS. 6–8. A dual container arrangement is shown by a phantom cap and spigot. The apparatus 260, having a rectangularly configured exterior design, is adapted to be disposed against a car door 250, with rectangular metallic hangers 290 secured over the sill 252 against window 254. If desired, the container 270 may also be of a rectangular configuration rather than the cylindrical configuration of the previous embodiments. Alternatively, the container apparatus may be of cylindrical configuration, as shown above. If the container is of a cylindrical configuration, the insulator shells 280 and 282 may include a cylindrical cavity in which the container is disposed. If the container is of a rectangular configuration, then the insulator shells may follow the general configuration of the container, as illustrated.

As shown in FIG. 9, the container 270 includes a cap 272 extending exteriorally of the insulator shells 280 and 282. A spigot 274 extends beneath the insulator shells, and a vent plug 276 is shown at the top of the insulator shells. As in previous embodiments, the insulator shells are substantially symmetrical and enclose the container in a removable manner for cleaning.

If a rectangularly configured container is used within the apparatus, then a rectangular baffle(s) may also be included within the container. The cap 272 encloses a mouth which is substantially the width of the container, whether rectangular or cylindrical in configuration. If rectangular, then the baffle, being flexible as in the previous embodiments, may be removed from appropriate grooves within the container and then removed from the apparatus through the mouth of the container, lengthwise. The general design of cap 272 may be substantially identical to cap 210 illustrated in FIG. 8 and discussed in detail in conjunction therewith.

The rectangularly configured insulator shells 280 and 282 do not include provisions for a top filler, such as shown in the embodiments of FIGS. 1–3, but do include the vent plug at the top of the apparatus and the spigot at the bottom of the apparatus. If a dual container, such as the dual cylinders 240 of FIGS. 6–8 are included, the insulator shells include provisions for a central insulation partition to separate the dual containers, and include appropriate apertures for the vent plugs and spigots, and, of course, the mouth(s) of the containers which extend longitudinally outwardly from the insulator shells.

The apparatus 260 is supported by a pair of generally U-shaped brackets 292 which extend about the insulator shells, also in relieved portions or grooves, as in the previous embodiments.

The brackets 292 include a top hanger portion 294 adapted to seat on molding 252 of the door 250 adjacent the window 254. The holder 290 also includes a downwardly extending portion, remote from the bracket 292, and secured to the top portion 294, which extends downwardly within the door, substantially parallel to the window 254. The holder 290 provides a bias on the insulator shells 280 and 282 to hold them together about the container 270, and the total apparatus, including the container, the insulator shells, and the holder, provides a relatively compact unit designed to fit against a door for convenience.

Figures 10, 11, 12, 13:
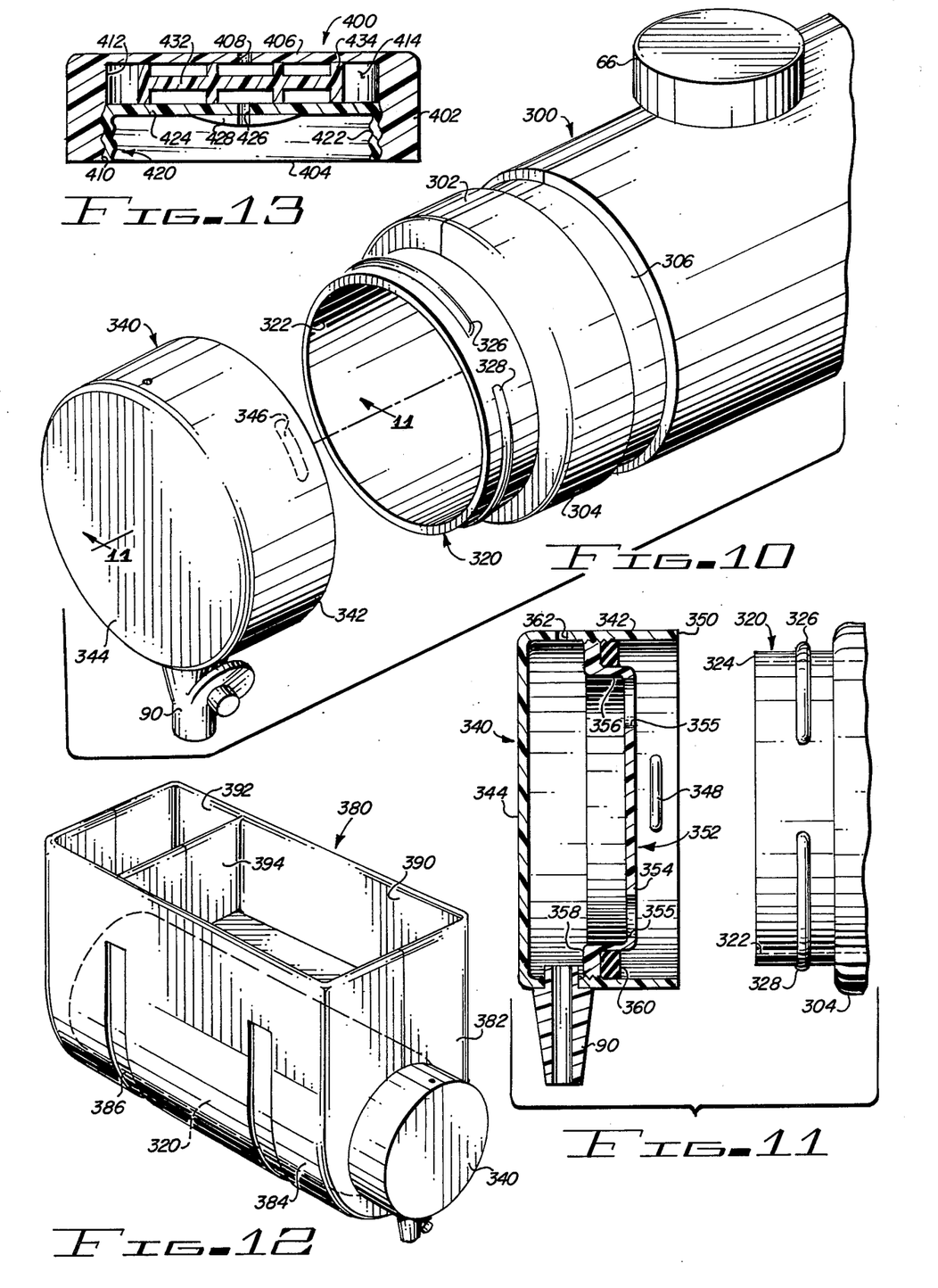
FIG. 10 is a perspective view of an alternate cap and spigot arrangement usable with the apparatus of the present invention.
FIG. 11 is a view in partial section of the cap taken generally along line 12—12 of FIG. 10.
FIG. 12 is a perspective view of an alternate apparatus embodying the present invention.
FIG. 13 is a view in partial section of a vented filler cap usable with the apparatus of the present invention.

FIG. 10 is a perspective view of an alternate embodiment of the apparatus of the present invention, comprising a spigot and vent plug integral with a cap. Container apparatus 300 includes a pair of insulator shells 302 and 304 disposed about a container 320. The container 320 includes an open end or mouth 322 which extends outwardly from the insulator shells 302 and 304. The container 320 includes a pair of semi-circular lock rings 326 and 328 disposed on the outer periphery of the cylindrical container 320 generally parallel to each other and slightly helical with respect to the longitudinal axis of the apparatus to cam the cap onto the container 320. The ends of the lock rings are spaced apart to allow for the insertion of a matching or mating lock lug 346 disposed on the inner periphery of cap 340.

The insulator shells include matching grooves 306 which extend circumferentially about the outer periphery of the insulator shells to receive straps of a harness which holds the insulator shells together about the container 320 and by which the apparatus 300 is supported. Such harness is illustrated above in conjunction with FIGS. 1, 3, and 6, and as further discussed below in conjunction with FIGS. 14–18.

The container apparatus 320 includes a central filler boss which extends upwardly from the insulator shells 302 and 304. The filler boss is closed by a cap 66, which is substantially the same as the cap 66 discussed above in conjunction with FIGS. 1 and 2, and which may be substantially identical to the cap 210 discussed in detail in conjunction with FIG. 8.

Cap 340 is shown spaced apart from the container 320 and from the insulator shells 302 and 304. It is a generally cup-shaped cap, including a cylindrical portion 342 and a closed end wall 344. On the inner periphery of the cylinder wall 342 are a pair of locking lugs 346 (and 348, shown in FIG. 11). Only one lug 346 is shown in phantom in FIG. 10. The arcuate length of the lugs 346 and 348 are substantially the same as the arcuate distance between the adjacent ends of the lock rings 326 and 328 on the container 320. The lug 346, when the cap 340 is assembled to the container 320, extends downwardly lengthwise between the lock rings 326 and remote from the mouth 322, and rotary motion is then applied to the cap 340, clockwise as viewed in FIG. 10, to secure the cap 340 to the container. The lug 346 engages the lock ring 328, against which it is juxtaposed, and a camming effect between the lug and the lock ring secures the cap to the container. If desired, there may be a slight angular or helical orientation of the lock rings, as discussed above, to insure a sealing engagement between the cap and the container by the biasing effect of the lugs against the lock rings. The lugs 346 and 348 are preferably disposed diametrically opposite each other on the inner periphery of the cylindrical portion 342 of the cap 340. If desired, there may be more than two lugs on the inner periphery of the cap, and a corresponding number of spaced apart lock rings on the outer periphery of the container 320.

FIG. 11 is a view of a portion of the apparatus of FIG. 12, in partial section, taken generally along line 11—11 of FIG. 12. It comprises a view in partial section of the cap apparatus 340, showing its construction, spaced apart from the container 320.

With respect to container 320, the lock rings 326 and 328 are shown on the outer periphery of the container, adjacent, but spaced apart from each other, and separated axially on the outer periphery of the container from a rim 324. In turn, the lock rings 326 and 328 are axially spaced apart slightly from the insulator shells of which insulator shell 304 is shown in FIG. 11.

The cap 340 is shown in partial section as including a cylindrical portion 342 and a closed end wall 344. On the inner periphery of the cylindrical portion 342 is a lug 348. The lug 348 is substantially identical to the lug 346 shown in phantom in FIG. 10, and located diametrically across from it. When the cap 340 is secured to the container 320, the lug 348, and also the lug 346, fit on the exterior of the container 320 and between the lock rings 326 and 328. The lock rings are spaced apart a sufficient distance to allow the lugs to extend therebetween. The outer diameter of the container 320 is substantially the same as the inside diameter of the cylindrical portion 342 of the cap 340. Accordingly, there is relatively close tolerance between the two, and the lugs and lock rings extend inwardly and upwardly, respectively, from the cap and cylinder to allow them to cam against each other as the cap 340 is turned relative to the cylinder 320 to secure the cap and the cylinder together.

Within the cap 340, and spaced apart axially from a rim 350, which is remote from the closed end wall 344, is a threaded insert 352. The insert 352 includes a generally flat central planar portion 354, an axially extending portion 356 on the outer periphery of the planar portion 354, and a radially outwardly extending flange portion 358 which extends outwardly from the axially extending portion. The outwardly extending portion 358 is threaded on its outer periphery and it mates with a threaded portion on the interior of the cylindrical portion 342 of the cap 340. An annular gasket 360 is disposed about the axially extending portions 356 and against the outwardly extending flange portion 358. When the cap 340 is secured to the cylinder 320, the gasket 360 is disposed against the rim 324 of the container and is held in place against the container to sealingly secure the cap to the container by the camming bias action of the lugs 346 and 348 and the lock rings 326 and 328.

A spigot 90 is secured to the cylindrical portion 342 of the cap 340 to allow fluid to drain from the container 320. Communication between the container 320 and the spigot 390 in the cap 340 is accomplished by a plurality of apertures 355 which are disposed on the outer periphery of the planar or flat central portion 354 of the insert 352, adjacent the axially extending portion 356 of the insert 352.

A vent hole or aperture 362 extends through the cylindrical portion 342 of the cap 340 substantially diametrically opposed to the spigot 90.

With respect to the interior of the cylinder 320, an appropriate groove and baffle, such as disclosed above in conjunction with FIGS. 2, 4, and 5, may be employed. Moreover, if desired, the apparatus illustrated in FIGS. 10 and 11 may also be of a double cylinder type, such as shown in conjunction with FIGS. 6 and 7.

FIG. 12 is a perspective view of an alternative embodiment of the apparatus of FIGS. 10 and 11, comprising a partially rectangularly configured pair of insulator shells usable with the container 320 and cap 340 of FIGS. 10 and 11. The container 340 is disposed within insulator apparatus 380, which comprises a pair of insulator shells 382 and 384.

The insulator shells 382 and 384 are substantially symmetrical with respect to each other, but comprise a combination of the cylindrical designs heretofore shown, particularly in conjunction with FIGS. 10 and 11, and the rectangular configuration illustrated in FIG. 9. The bottom portion of the insulator shells is curved, with a radius of curvature of a relatively constant amount with respect to the curvature of the container 320. Accordingly, only a slight modification of the metallic holder apparatus 290 is required to appropriately secure the insulator shells together about the container 320 and to suspend the apparatus, as desired, either from a window, as shown in FIG. 9, or from a seat, as desired. A pair of grooves or depressions 386 is disposed in the outer periphery of the insulator apparatus 380, and extend about the bottom of the apparatus, and up both sides, to receive appropriate brackets, similar to the metallic brackets 290 shown in FIG. 9.

The upper portion of the insulator apparatus 386 includes a pair of compartments 390 and 392. The compartments 390 and 392 extend downwardly from the upper portion of the insulator apparatus, and may receive items, as appropriate, which may be handy for the occupants of the automobile or vehicle in which the apparatus is used. For example, the compartment 390 may receive a box of tissue, convenient for both a driver of a vehicle or for passengers, while the compartment 392 may be used for smaller items. Note pads, pencils, coloring books, small games, toys, or the like may be used while traveling, as with a family, for both compartments. If desired, the two compartments 390 and 392 may simply be a single, larger compartment, by the elimination of partition 394 which divides or separates the two compartments. Having a spigot and a vent integral with a cap, such as cap 340, allows the container apparatus to be conveniently inserted into a cylindrical bore within the insulator apparatus. The container may be removed, as desired, and the insulator apparatus may accordingly be used on short trips, if desired, without the container in order to utilize the compartments. Moreover, and if desired, a double container apparatus utilizing the features of the cylinder 320, with appropriate baffles therein, as discussed above, and cap 340, may also be employed with the insulator apparatus 380 illustrated in FIG. 12.

If it is deemed desirable to eliminate the vent plugs 70, illustrated in FIGS. 2 and 7, a vented cap 400, as shown in FIG. 13, may be used in place of the cap 66 illustrated in conjunction with FIGS. 1 and 2. The vented filler cap 400 includes a cylindrical portion 402, with an open end 404, and a closed end wall 406. The closed end wall 406 includes an aperture 408 centrally disposed with respect to the closed end wall 406. Within the cylindrical portion 402 and adjacent the open end 404, and extending from the open end 404 axially along the inner periphery of the cylindrical portion 402, a distance toward the closed end wall 406, is an internally threaded portion 410. Between the termination of the internal threads 410 and the inner side of the end wall 406 is a bore 412. The aperture 408 communicates with the bore 412.

An insert 420 is disposed within the cap 400. The insert 420 is also generally of a cylindrical configuration, although of a shorter cylindrical configuration than the cap 400. The insert includes a threaded portion 422, which comprises the sides of a cylinder and which matingly engages the threaded portion 410 of the cylindrical portion 402 of the cap 400. The threaded portion 420 includes both external and internal threads. The external threads matingly engage the internal threads 410 of the cylindrical portion 402 of the cap, while the internal threads of the threaded portion 422 mate with the external threads of an appropriate filler boss, such as the threads 62 of filler boss 60 shown in FIG. 2.

The insert 420 includes an end wall 424 which is spaced apart from the end wall 406, and with the insert 420 in position, comprises a closed end for the bore 412. An aperture 426 extends through the end wall 424, preferably centrally disposed with respect thereto. The aperture 426 communicates with the bore 412. A chamber 414 is defined between the end wall 424 of insert 420, the bore 412, and the end wall 406 of the cap 400. The apertures 408 and 426 communicate with the chamber 414.

Disposed within the chamber 414 is a baffle spacer 430, which comprises a plate 432 having a plurality of oppositely extending bosses or feet 434. With the baffle spacer 430 disposed in the chamber 414, the bosses or feet 434 contact the end walls 406 and 424 and accordingly space apart the end walls 406 and 424 as the insert 420 is screwed into the cap 400. The feet or bosses 434 also provide a tortuous or elongated path for air to flow into and out of the chamber 414, and through the apertures 408 and 426, to provide appropriate venting of a container with which the apparatus is disposed. The plate 432 prevents the fluid from within the container from sloshing or spilling out of the cap during the use of the apparatus. The employment of the vented cap 400 obviates the necessity of a separate vent plug as disclosed in other Figures of the drawing and as discussed above.

Figure 14:
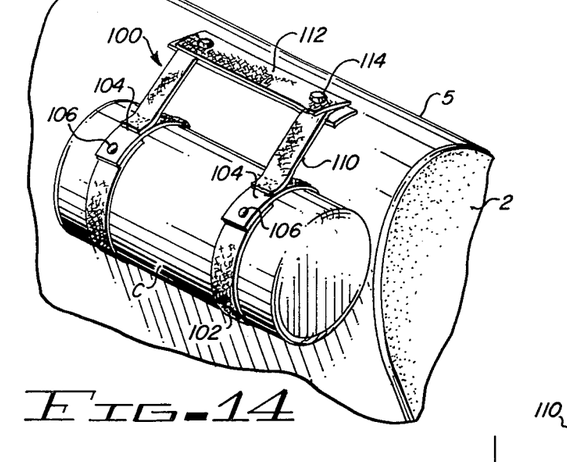
FIG. 14 is a perspective view of holder or carrier apparatus for the containers of the present invention.

FIG. 14 is a perspective view of a cylindrical container of the present invention showing the securing of the container to a car seat by use of the harness 100, shown above in FIGS. 1 and 3. For convenience, the cylinder shown disposed within the harness 100 is designated by the letter "c" rather than by a particular reference numeral since it is understood that the harness 100 may be used with any of the cylindrical containers. With reference to the car seat 2 and back 4, illustrated in FIGS. 1 and 3, the harness 100 is shown secured to the car seat at its upper or top part 5, and the head rest 6 illustrated in FIG. 1 has been removed.

The harness 100 includes a pair of loops 102, each of which includes an overlapping portion 104, and a pair of snaps 106 are used to secure the overlapping portions of the straps together into a unitary loop. The straps 102, of course, fit into the circumferentially extending grooves on the exterior periphery of the insulator shells.

Radially outwardly extending portions 110 of the harness 100 are secured in the center of the overlapping portions, as by stitching. The straps 110 are appropriately folded and sewn to comprise a cross-piece 112 which extends between the two loops. At the folds between the straps 110 and the cross-piece 112 are snaps 114.

The opposite ends of the harness 100 are identical to each other, and they may be spaced apart to fit each size container apparatus. The strap 110 is preferably a single strap, sewn at both ends to the respective loops, and folded over itself, as described below, to define an end reinforced cross-piece 112.

Figure 15:
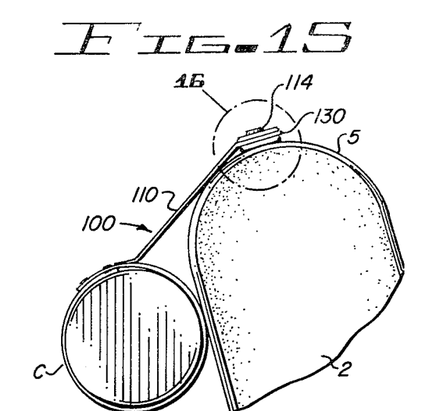
FIG. 15 is a side view of the apparatus of FIG. 14.

FIG. 15 is an end view of a cylinder C with a harness 100 securing it to a top portion 5 of a seat 2 in a vehicle. The length of the straps 110 may be varied, as desired, to allow the container C to hang at any appropriate or desired level with respect to the seat 2. For convenience, the harness 100 is preferably secured to the top 5 of a seat and to a base piece 130, which is part of the harness assembly 100, and which includes a mating portion of the snap 114. The base piece 130 may be disposed in, and secured to, a seat at any desired location. The base piece, since it is a single piece and includes the mating portions of the snaps, is easily installed in the proper, level, orientation for the container and automatically spaces apart the snaps for proper hanging of the harness.

Figure 16:
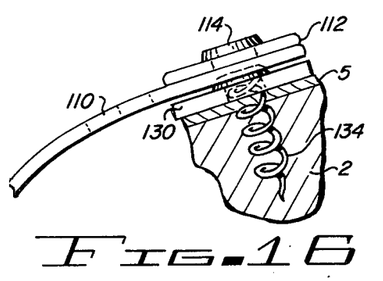
FIG. 16 is an enlarged view in partial section taken from circle 16 of FIG. 15.

FIG. 16 is a view in partial section of the apparatus of FIG. 15 taken generally from the circle 16 of FIG. 15. The strap 110 is shown extending, as from container C of FIG. 15, to the top portion 5 of the seat 2. The crosspiece 112 is shown with a snap 114 secured to the folded and reinforced corner portion of the strap 110 and cross-piece 112.

Beneath the cross-piece 112, and substantially coextensive therewith, is a base piece 130. The base piece 130 includes a mating portion of the snap 114 which thus allows the harness 100 to be secured to the seat 2. The base piece 130 is secured to the seat by a spiral screw 134, which is well known in the art. An advantage of using the spiral screw 134, which is also known as a fabric screw, is that it may be easily inserted and withdrawn through the fabric cover of a seat, leaving only a single, rather small, puncture or hole through the seat. The screw holds substantially securely to the seat, and to any material within the seat, such as stuffing or padding, or the like.

Figure 17:
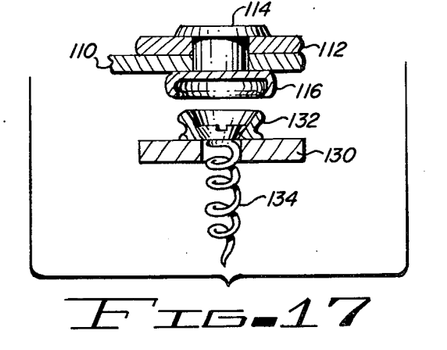
FIG. 17 is an enlarged view in partial section of a portion of the apparatus of FIG. 16.

FIG. 17 is a view in partial section of a portion of the apparatus of FIG. 16, showing the securing together of the strap 110 and the base piece 130 in an enlarged detail. The snap 114 which extends through the cross piece 112 and the strap 110 includes a receptacle portion 116 which mates with a head 132 secured to the base 130. The receptacle 116 and the head 132 together comprise a complete snap which secures the harness together. The head 132 is secured to the base 130 by appropriate, well known methods. Screw 134 extends through the head 132 and through the base 130 and is in turn used to secure the base 130 to the top of a seat.

Figures 18A, 18B:
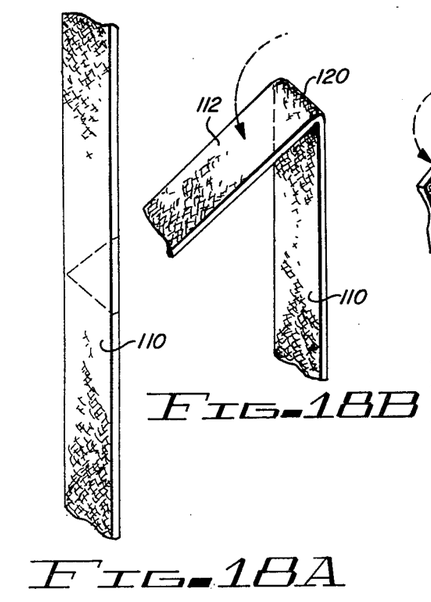
FIGS. 18A, 18B, 18C, and 18D, are sequential views illustrating the folding and making of the carrier apparatus illustrated in FIGS. 14–17.
Figures 18C, 18D:
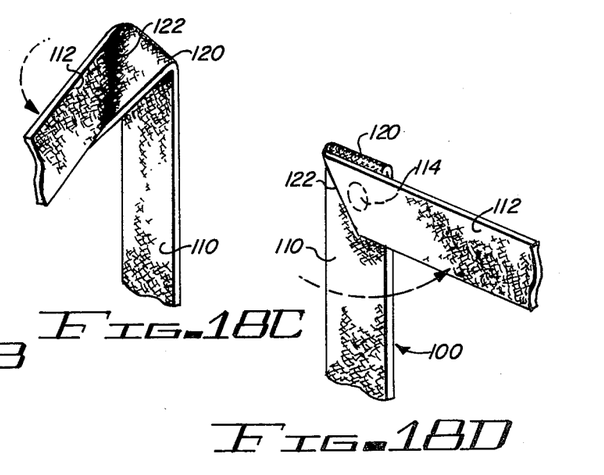

FIGS. 18A, 18B, 18C, and 18D are sequential views illustrating the folding of the strap 110 to comprise the cross piece 112. The strap 110 is first folded substantially down on itself, as illustrated in FIG. 18B, with a fold 120. The fold 120 is accordingly substantially perpendicular to the sides or edges of the strap 110. The portion of the strap 110 which will comprise the cross piece is then folded again with a diagonal fold 122 so that the cross piece 112 is substantially perpendicular to the strap 110. The strap 110 and the cross piece 112 are then appropriately sewn to maintain the folds 120 and 122 in their correct alignment. The snap 114 is then secured at the fold so that the snap extends through three layers of the strapping. The corner of the strapping thus is reinforced since it comprises three layers of the strap. The harness 100 may then be used to carry the container apparatus by means of the cross piece 112.

The apparatus disclosed herein comprises a relatively inexpensive insulated liquid or fluid container which is easily disassembled or taken apart for cleaning. The apparatus includes various embodiments which have related features, such as an air valve or vent separate from the spigot to vent the interior of the container as liquid is removed from the spigot to prevent surges in the outflowing stream of liquid. A baffle is removably disposed in the container to inhibit or retard the longitudinally axial flow of the liquid within the container.

The container, in one embodiment, includes an end cap on one end which, when removed, provides access to the interior of the container. The open end of the container, covered by the end cap, is of the same diameter as the container and accordingly provides unrestricted access. A separate filler boss is provided for filling the container when the container is horizontally disposed in its normal use orientation.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and rules promulgated under the authority thereof.

What is claimed is:

1. Liquid carrier and dispenser apparatus for vehicles, comprising, in combination:
   container means having an interior for holding a quantity of liquid and having a longitudinal axis disposed in a generally horizontal orientation, and a first end and a second end equally perpendicular to the longitudinal axis;
   insulation means disposed about the container means;
   an end cap disposed at and removably secured to the first end of the container means for sealing the end of the container means when secured thereto and for providing access into the interior of the container means when removed therefrom;
   a filler boss extending upwardly from the container means substantially perpendicular to the longitudinal axis of the container means and communicating with the interior of the container means for filling the container means with a liquid;
   cap means removably secured to the filler boss for providing access into the interior of the container means when removed therefrom and for venting the interior of the container means as liquid is drained from the interior of the container means, including
      a cylindrical portion,
      an end wall disposed at one end of the cylindrical portion and including a first aperture extending therethrough,
      an insert secured to the cylindrical portion and including a second aperture extending therethrough, and
      a spacer disposed between the end wall and the insert to prevent direct communication between the first and the second apertures; and
   spigot means for selectively draining liquid from the container means.

2. The apparatus of claim 1 in which the insulation means comprises a pair of mating insulator shells removably secured to the container.

3. The apparatus of claim 1 in which the container means includes baffle means disposed in the interior of the container means to inhibit the flow of liquid within the interior of the container.

4. The apparatus of claim 3 in which the baffle means includes a disc having a plurality of apertures extending therethrough to allow liquid to pass through the disc, and a groove disposed in the container means for receiving the disc.

5. The apparatus of claim 1 in which the insulation means includes harness means for securing the insulator shells to the container means and for supporting the apparatus.

6. The apparatus of claim 5 in which the harness means includes a pair of loops disposed about the insulator shells and spaced apart from each other and a cross piece connected to the pair of loops.

7. The apparatus of claim 6 in which the harness means includes means for securing the apparatus to a fixed location in a vehicle.

8. The apparatus of claim 7 in which the means for securing the apparatus to a fixed location includes a base piece substantially coinciding in length with the cross piece, a pair of snaps spaced apart on the base piece and including screw means for securing the base piece to the fixed location, a pair of snaps spaced apart on the cross piece to matingly engage the pair of snaps on the base piece to secure the harness means to the base means.

9. The apparatus of claim 6 in which the harness means further includes means for realeasably securing the loops to the insulator shells.

10. The apparatus of claim 9 in which the harness means further includes a strap extending from each of the loops to the cross piece.

11. The apparatus of claim 10 in which the insulation means includes a pair of circumferentially extending grooves which receive the pair of loops of the harness means.

* * * * *